(12) United States Patent
Moitrel et al.

(10) Patent No.: US 7,434,070 B2
(45) Date of Patent: Oct. 7, 2008

(54) SECRET CODE SECURITY ACCESS TO DATA PROCESSING MEANS

(75) Inventors: Pascal Moitrel, Aubagne (FR); Johan Pascal, Saint Jean de Maruejols (FR)

(73) Assignee: Gemplus, Gemenos (FR)

( * ) Notice: Subject to any disclaimer, the term of this patent is extended or adjusted under 35 U.S.C. 154(b) by 807 days.

(21) Appl. No.: 10/362,281

(22) PCT Filed: Jun. 21, 2001

(86) PCT No.: PCT/FR01/01947

§ 371 (c)(1),
(2), (4) Date: Apr. 24, 2003

(87) PCT Pub. No.: WO02/19283

PCT Pub. Date: Mar. 7, 2002

(65) Prior Publication Data

US 2003/0172029 A1    Sep. 11, 2003

(30) Foreign Application Priority Data

Aug. 29, 2000  (FR) .................................. 00 11054

(51) Int. Cl.
*G06F 11/30* (2006.01)

(52) U.S. Cl. ........................ 713/194; 713/159; 713/172; 713/181; 713/182; 713/183; 713/184; 713/185; 726/9; 726/20

(58) Field of Classification Search ......... 713/182–185, 713/172, 159, 194; 726/9, 20; 705/41, 64, 705/67, 71–72, 75–76; 235/380–382; 707/9; 711/152; 710/67; 725/30
See application file for complete search history.

(56) References Cited

U.S. PATENT DOCUMENTS

| | | | |
|---|---|---|---|
| 4,786,790 A | | 11/1988 | Kruse et al. |
| 4,907,272 A | | 3/1990 | Hazard et al. |
| 5,216,633 A | * | 6/1993 | Weon et al. ............ 365/189.07 |
| 6,021,201 A | | 2/2000 | Davis et al. |
| 6,257,486 B1 | * | 7/2001 | Teicher et al. ............... 235/380 |
| 6,304,658 B1 | * | 10/2001 | Kocher et al. .................. 380/30 |
| 6,470,454 B1 | * | 10/2002 | Challener et al. ............. 726/17 |

FOREIGN PATENT DOCUMENTS

| | | |
|---|---|---|
| DE | 3904215 | 8/1989 |
| EP | 1004980 | 5/2000 |
| FR | 2496294 | 6/1982 |

* cited by examiner

Primary Examiner—Kimyen Vu
Assistant Examiner—Baotran N To
(74) Attorney, Agent, or Firm—Buchanan Ingersoll & Rooney PC

(57) ABSTRACT

Access control to data processing means, such as a smart card, is made secure by simulating a comparison block by block of part of a secret code with part of a presented code through a block-by-block comparison of part of the presented code and part of a determined number when the presented code is found to be erroneous. Each time the card is used, a constant number of operations are applied to the presented code and at least for part of the secret code, and at most for a complementary part to the determined number, thus avoiding different signatures of power consumption for different presented codes.

13 Claims, 3 Drawing Sheets

SECRET CODE SECURITY ACCESS TO DATA PROCESSING MEANS

This disclosure is based upon French Application No. 00/11054, filed on Aug. 29, 2000 and International Application No. PCT/FR01/01947, filed Jun. 21, 2001, the contents of which are incorporated herein by reference.

BACKGROUND OF THE INVENTION

The present invention generally relates to any electronic data processing means whose features, or services which are related to it, are accessible by means of a secret code, also referred to as a "password" or a "confidential code", which is usually received by the processing means on being entered on the keypad of host means for hosting the processing means.

For example, the data processing means are a micro-controller card, also referred to as an "integrated circuit card" ("IC card") or a "smart card", such as a credit card for a bank terminal or an electronic purse card for a point of sale terminal, or for any other terminal such as a mobile radiotelephone terminal equipped with an additional card reader, or else such as a subscriber identity module (SIM) card in a mobile radiotelephone terminal.

More particularly, the invention relates to the security of the access control for controlling access to the features of the smart card by means of a code which is presented to it, and which is compared with a secret code associated with the smart card and pre-recorded therein.

An attacker, i.e. a dishonest person, who wants to find out the secret code of a smart card can perform signal power analysis (SPA) by connecting an instrument for measuring the voltage across the electrical interface between the smart card and its host terminal.

In a prior art smart card, the secret code pre-recorded in a non-volatile memory of the smart card, and the presented code written temporarily in the random access memory (RAM) of the smart card are subdivided into blocks and compared block-by-block. If, after one of the block comparisons, the respective blocks are not identical, the following block comparisons are not executed, and the presented code is refused for access to the features. The duration of the verification of the presented code thus depends on the number of first correct blocks in the presented code. Therefore, the duration of the manipulation of the secret code for verifying any presented code with a view to authenticating the genuine holder of the smart card varies, thereby implicitly giving information about the secret code when power consumption characteristics of the smart card are recorded and when the durations of the comparisons for various presented codes are measured.

SUMMARY OF THE INVENTION

An object of the present invention is to remedy such leakage of information about the secret access code for accessing data processing means, such as a smart card, and thus to eradicate differences in electrical power consumption and in comparison duration regardless of the erroneous presented code.

To this end, a method of accessing data processing means associated with a secret confidential code and accessible by means of a host terminal applying a presented confidential code to it is characterized in that, each time the processing means are used, the method comprises a constant number of predetermined operations which are applied to the presented code, at least a fraction of said number of operations also being applied to the secret code, and at most a complementary fraction relative to said number of operations also being applied to a determined number. The predetermined operations include comparisons block-by-block of the presented code and of the secret code so long as the compared blocks are identical, and comparisons block-by-block of a fraction of the presented code and of a fraction of a number whenever compared blocks of the presented code and of the secret code are different until all of the blocks of the presented code have been compared.

The comparisons relating to a fraction of the presented code and to a fraction of the determined number which does not contain data related to the secret code and which acts as a dummy secret code, simulate the first comparisons, i.e. perform a dummy manipulation of the secret code, as seen from the outside, whenever the presented code is detected as being erroneous.

Since the number of block-by-block comparisons is always constant, independently of whether the presented code is correct, partly erroneous, or totally erroneous, and more generally since the succession of executed operations is constant for all of the presented codes, no significant signature as regards power consumption measurement is detectable from one presented code to the next.

BRIEF DESCRIPTION OF THE DRAWINGS

Other characteristics and advantages of the present invention will appear more clearly on reading the following description of preferred implementations of the invention, given with reference to the corresponding accompanying drawings, in which.

Figure 1:
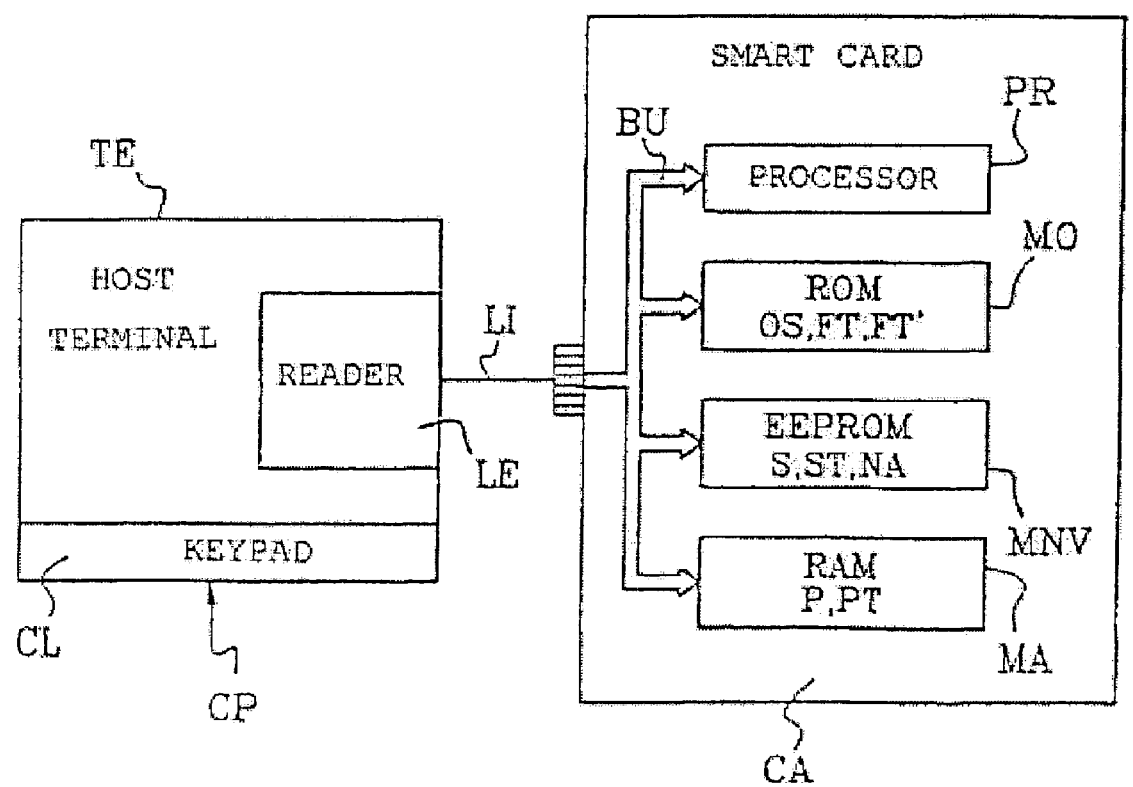
FIG. 1 is a block diagram showing a system for implementing the access control method of the invention in the context of a smart card.

In the block diagram shown in FIG. 1, electronic data processing means are constituted by a smart card CA whose "chip" is composed of a micro-controller. Diagrammatically, the micro-controller comprises a central processing unit CPU formed by a microprocessor PR, by a memory MO of the read-only memory (ROM) type including an operating system OS of the card, and in particular specific authentication, communications, and application algorithms, by a non-volatile memory MNV of the programmable and erasable type, such as an electrically erasable programmable read-only memory (EEPROM), which contains data, in particular data related to the holder of the card and to the supplier of the card, and by a memory MA of the random access memory (RAM) type serving to receive, in particular, data from a host terminal TE for hosting the card. All of the components PR, MO, MNV, and MA are interconnected by an internal bus BU.

The host terminal TE, such as a bank terminal or a telephone terminal, is equipped with a keypad CL, in particular for entering a confidential code P referred to as the "presented code", to be presented to the card. A portion of the card CA is inserted into a reader LE of the terminal TE. The portion of the card that is inserted contains the micro-controller and typically supports six to eight electrical contacts of an electrical link LI between the reader LE and the internal bus BU of the card CA when the card is of the contact type.

Figure 2:
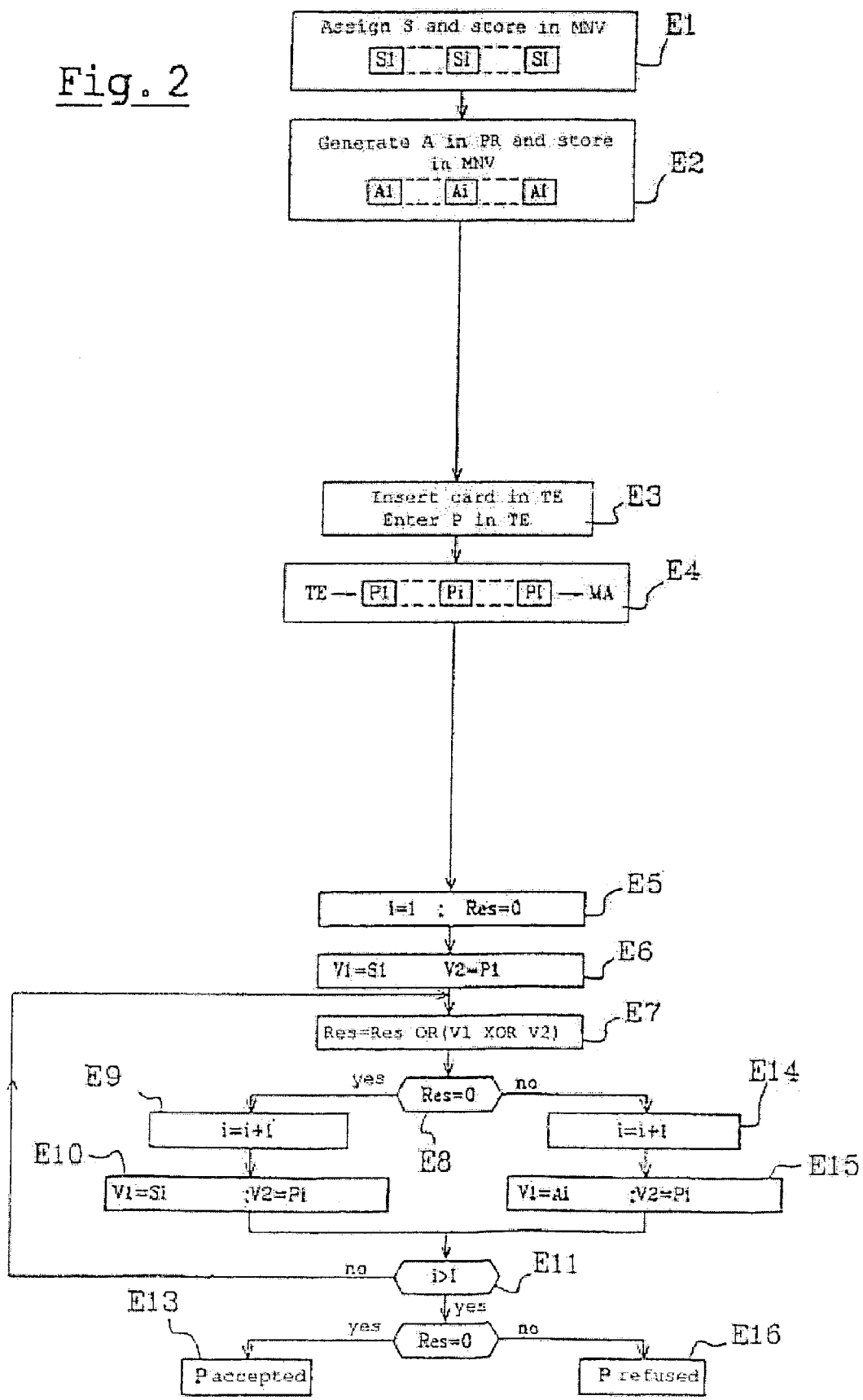
FIG. 2 is an algorithm of the main steps of the access control method in a preferred implementation of the invention.

With reference to FIG. 2, the access control method in a preferred implementation of the invention for the smart card CA shown in FIG. 1 essentially comprises steps E1 to E16.

The first step E1 is a prior step performed previously at the card supplier's, when the card is manufactured and then when the card CA is acquired, e.g. when a subscription is taken out for a service accessible via the features of the card.

As a function of the card manufacturer's data, in particular, the card supplier assigns to the card CA a secret code S having a plurality of digits and that is written in a predetermined location in the non-volatile memory MNV of the card CA. The secret code S is subdivided into I blocks of bits S1 to SI, each block comprising, for example, a predetermined number of eight-bit bytes typically varying in the range one byte to a few bytes.

During the prior step E2, a determined number A is generated, generally randomly, by the processor PR of the card CA. The number A has the same size as the code S and is subdivided into I blocks of bits A1 to AI. Preferably, the secret code S and the determined number A are written in spaces in the non-volatile memory MNV of the card CA that correspond to addresses having numbers of bits NB0 and NB1 respectively at the logic states "0" and "1" that are substantially identical; for example, for 8-bit addresses, the addresses "11011011" and "11101110" where NB0=2 and NB1=6, or else the addresses of adjacent spaces "100011111" and "00011110" where NB0=3 and 4 NB1=5 and 4, are satisfactory, in order for reading a block Si of the secret code to be similar to reading a block Ai of the random number, and thus the two readings are almost identical as seen by electrical power consumption measurement. This contributes to avoiding the appearance of power consumption signatures that are different between comparisons relating to presentations of presented codes that are different.

Steps E3 to E16 are performed after the card CA has been inserted into the reader LE of the host terminal TE which is thus connected via the electrical link LI and via the internal bus BU to the micro-controller of the card CA.

Each time the card is used, a presented code P which must be normally identical to the secret code is entered on the keypad CL of the terminal TE during the step E3 in order to verify the presented code in the card CA. Either as the digits of the presented code (e.g. four digits) are being entered, or continuously, the terminal TE transmits the presented code P to the card CA over the link LI and over the bus BU so that it is written into the RAM MA, in step E4.

In the following steps E5 and E6, the processor resets the internal registers for an index i and a comparison result logic variable Res, and it sets two internal registers for block variables V1 and V2 to the values of the first blocks Si and P1 read respectively from the memories MNV and MA.

Then, in a first step E7 of a loop E7-E11, the processor PR compares the variables V1 and V2, i.e. the first block S1 of the secret code in the memory MNV and the first block P1 of the presented code in the memory MA, by adding the preceding loop comparison result Res in compliance with the following logic relationship:

Res=Res OR(V1 XOR V2)

i.e. Res=Res OR(S1 XOR P1)

If the result Res is still equal to zero at the following step E8, i.e. if the compared variables V1=S1 and V2=P1 are identical, the index i is incremented in step E9, and the variables V1 and V2 are set to the values of the following blocks S2 and P2 in step E10. If the index i is not greater than I in step E11, another loop E7 to E11 is executed to compare the second blocks P2 and S2, and to increment the index i, and so on so long as the compared blocks Pi and Si are identical, and until the index i reaches the index I. In which case, the result variable Res remains equal to zero until the step E12 succeeding step E11, and the blocks Pi of the presented code are respectively identical to the blocks Si of the secret code. The final step E13 accepts the presented code P so as to give access to features of the card CA, e.g. a pay service application or a telephone service application.

Returning to step E8, if the result variable Res is equal to 1, i.e. if one of the blocks (Pi) of the presented code P is different from the respective block Si of the secret code S, the code P is not immediately refused, but rather, in the invention, continues to be processed by the processor PR as if, as seen from outside the card, the presented code P were not erroneous so that, in total, I loops of steps E7-E11 are always executed, i.e. I comparisons of blocks, i.e. i comparisons of blocks P1 to Pi and S1 to Si, and I−i comparisons of blocks P(i+1) to PI and A(i+1) to AI are always executed, the presented code P containing at least one erroneous block Pi.

Thus, as soon as Pi≠Si at step E8, the index i is incremented by one unit in step E14, and the processor PR sets the values of the variables V1 and V2 to the value of the block A(i+1) of the random number read from the memory MNV and to the value of the block P(i+1) of the presented code read from the memory MA in step E15 so as to compare them during step E7 of the following loop so long as i is not greater than I in step E11. However, the comparison result Res at step E7 is always equal to "1" regardless of the differences between the blocks P(i+1) to PI and A(i+1) to AI during the following loops, the processor PR continuing to execute the loop of steps E7, E8, E14, E15 and E11 until the blocks PI and AI are compared.

After the last comparison relating to the blocks PI and AI, the result Res being at "1" at step E12, the processor PR refuses the presented code P at step E16, e.g. by causing a suitable message to be displayed on the screen of the host terminal TE. A limited number of other code-entering attempts may optionally be authorized.

In a variant, the operations i=i+1 and V2=Pi in steps E9 and E10 and in steps E14 and E15 are executed between steps E7 and E8.

It is apparent that the number of steps between two possibilities offered at the conditional step E8 "Res=0?" is constant and the executed operations are identical from entering of the presented code P to the step E3, regardless of the contents of the presented code P. Therefore, the method always comprises a constant number of steps or of operations executed, and therefore of code lines, whether the presented code P is correct, or partially or totally erroneous. The duration of the method is therefore constant, and the variation in the electrical power consumption of the card during the method is almost identical independently of the presented code.

Thus, for I blocks, the processor executes k loops E7, E8, E9, E10, E11 relating to comparisons with the blocks S1 to Sk of the secret code, and I-k loops E7, E8, E14, E15, E11 (in a number complementary to k relative to I) relating to comparisons with the blocks A(k+1) to AI of the number A, where 1<k<I.

Preferably, two smart cards associated with identical secret codes are associated with different determined numbers A. Since the determined numbers are a priori random, and therefore different for the two cards, the effects of the manipulation of the random numbers cannot serve to characterize the cards.

Each secret code S preferably corresponds to a respective determined number A. Thus, advantageously, when the secret code associated with a card is modified, the determined number A is also modified. For example, if two digits of a secret code are inverted, the two determined numbers corresponding to these two versions of secret code are different. This variant prevents a determined number in a first card from being recognized by means of the manipulation of the determined number in another card associated with a code that it has in common with the first card.

Figure 3:
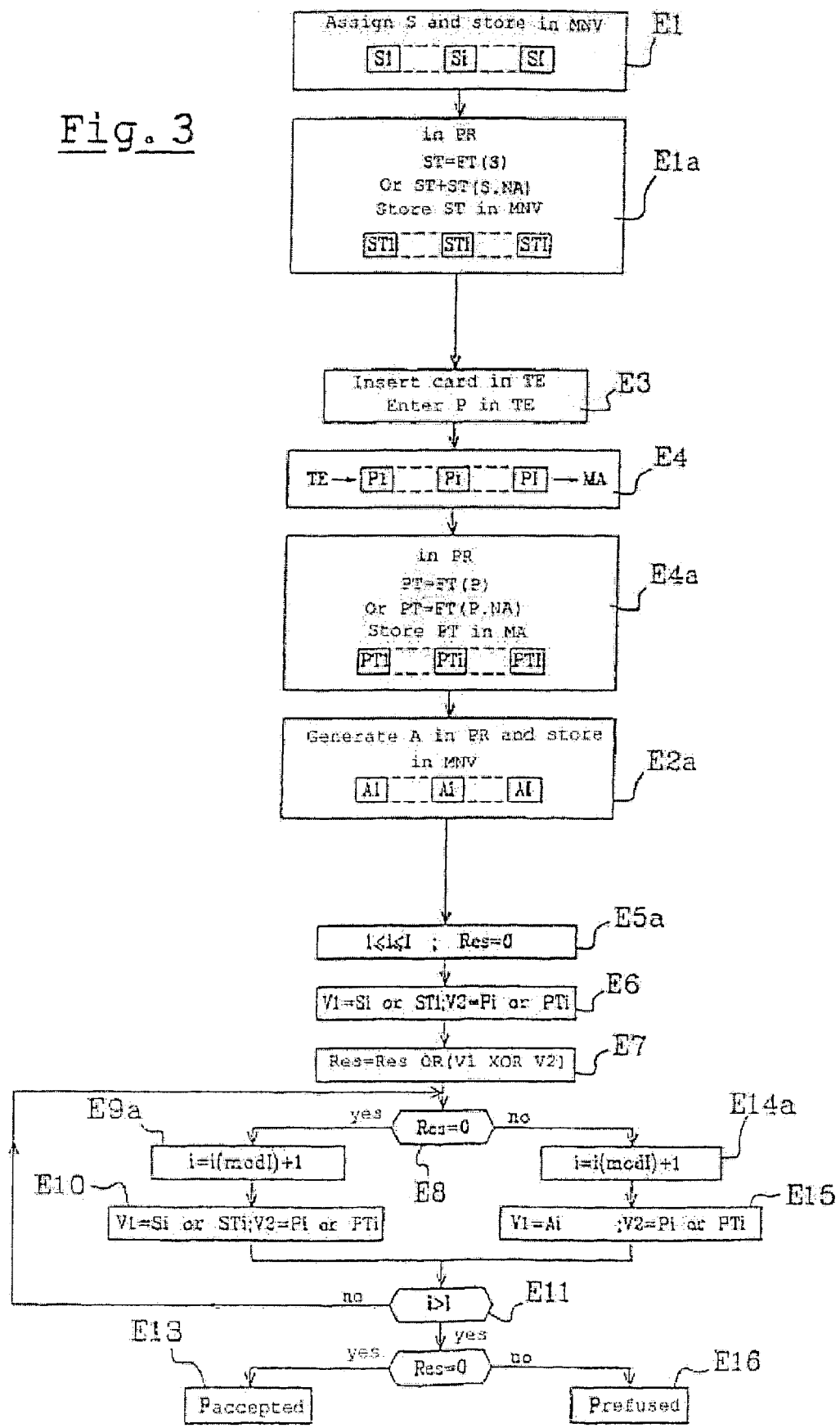
FIG. 3 shows variants of the algorithm of the method of FIG. 2.

FIG. 3 shows most of the access method algorithm of FIG. 2, with steps modified and/or added in compliance with variant steps indicated by the letter a and which further improve the security of control of access to the features of the card.

In a first variant, instead of generating the determined number almost at the time the card is brought into service, the processor PR generates the number A randomly and thus modifies it each time a presented code P is applied to the card CA to be verified in it, in a step E2a replacing step E2. Step E2a succeeds step E4 for writing the presented code P, and precedes the double loop E7 to E11 and thus the comparisons E7.

A number A being generated each time an erroneous code P is presented guarantees that the I comparisons of the blocks of the code P and of the blocks of the number A are never executed in the same way, to the detriment of an electrical power consumption that can vary significantly for presentations of the same erroneous code P.

In a second variant, the index i is chosen randomly from the range 1 to I by the processor PR in a step E5a in place of step E5. For this second variant, steps E9 and E14, which become E9a and E14a, include the incrementation i(mod I)+1 of the index i. This results in choosing a number A randomly from among I numbers if the number A is determined initially in step E2.

In a third variant, the access method further comprises a prior transformation E1a of the secret code S into a transformed secret code ST using a transformation function FT implemented in the memory MO of the card CA as data processing means, the transformation E1a lying between the steps E1 and E3; then, each time the card is used as data-processing means, a transformation E4a of the presented code P into a transformed presented code PT using the transformation function, prior to applying steps E5 to E16, and particularly block-by-block comparisons E7 but relating to the blocks STi and PTi of the transformed presented code and of the transformed secret code and to the determined number A, the transformation E4a succeeding step E4.

While the processing means constituted by the smart card are being used in this third variant, the secret code S replaced by the transformed code ST is not stored in it and is therefore not manipulated in the card during any presentation of the presented confidential code.

As described in French Patent Application No. 0007886 filed by the Applicant on Jun. 20, 2000, which corresponds to International Application No. PCT/FR01/01945 and U.S. application Ser. No. 10/311,698 filed Dec. 19, 2002, and incorporated into the present patent application by way of reference, the transformation function may be: irreversible; scrambling; linked to a random number NA set when the card is created, or else dependent on a second random number that can be varied each time the presented code is presented; applied iteratively as a function of the number of preceding presentations of the presented code; and a predetermined permutation of fractions of code; or a homomorphic function. Some of these transformation function characteristics may be mutually combined.

The following steps E6 to E11 are applied to the blocks ST1 to STI and PT1 to PTI of the transformed codes ST and PT written in the memories MNV and MA in place of the blocks S1 to SI and P1 to PI of the codes S and P, respectively.

In the description above, it can be understood that the term "smart card" covers all known types of cards having chips, also referred to as "microcontroller cards", such as the contact cards or contactless cards listed below by way of non-limiting example: credit cards, payment cards, pre-paid cards, telephone cards, subscriber identity module (SIM) cards, "additional" cards, central purchasing office cards, gaming cards, etc. More generally, the invention relates not only to smart cards but also to other portable electronic objects referred to generically as "electronic data processing means", such as electronic organizers or assistants, electronic purses, tokens, handheld calculators, etc.

The host terminal that receives the electronic data processing means may, for example, be of the following types: a computer terminal, a personal computer (PC) in particular a laptop PC, a point of sale terminal, a radiotelephone terminal, an access control device for controlling access to premises or to a strong cabinet, etc. The host means may be remote from the data processing means, which are then connected to the host means by any data transmission means.

The term "secret code" in the sense of the invention is also referred to in certain contexts as "password", or "confidential code", or else "personal identification number" (PIN) or "card holder verification" (CHV) or "personal telecommunications identifier" (PTI) in particular for SIM cards for radiotelephone terminals.

The secret code is, in general, an alphanumeric code. It may be applied to the data processing means (smart card or portable electronic object) by any known code input means, other than a keypad or keyboard, e.g. by voice recognition, or by recognition of a biometric signature, e.g. at least one fingerprint.

The invention claimed is:

1. A method of accessing data processing means associated with a secret code and accessible by means of a host terminal applying a presented code to said data processing means, said method comprising the steps wherein, each time the processing means are used, a constant number of predetermined operations are performed, said operations including comparisons block-by-block of the presented code and of the secret code so long as the compared blocks are identical, and comparisons block-by-block of a fraction of the presented code and of a fraction of a determined number whenever compared blocks of the presented code and of the secret code are different, until all of the blocks of the presented code have been compared, so as to obtain a succession of executed operations that is constant whether the presented code is correct, partially erroneous, or totally erroneous.

2. The method according to claim 1, wherein the secret code and the determined number are written in spaces of a non-volatile memory of the processing means, which spaces correspond to addresses having numbers of bits at respective ones of the logic states "0" and "1" that are substantially identical, so that reading a block of secret code is similar to reading a block of the determined number as seen through an electrical power consumption measurement.

3. The method according to claim 1, wherein the secret code and the determined number are written in adjacent spaces of a non-volatile memory of the processing means, so that reading a block of secret code is similar to reading a block of the determined number as seen through an electrical power consumption measurement.

4. The method according to claim 1, further comprising the step of modifying the determined number each time that a presented code is applied to the processing means, prior to applying the predetermined operations.

5. The method according to claim 1, wherein two data processing means associated with identical secret codes are associated with different determined numbers.

6. The method according to claim 1, wherein the determined number is modified when the secret code associated with the processing means is modified.

7. The method according to claim 1, further comprising the following steps:

transforming the secret code into a transformed secret code using a transformation function implemented in the processing means;

transforming the presented code into a transformed presented code using the transformation function; and comparing block-by-block the transformed presented code and the transformed secret code.

8. A method for processing a code that is presented to gain access to a data processing means that is protected by a secret code, comprising the steps of:

comparing block-by-block the presented code and the secret code for i iterations, until the compared blocks do not match; and thereafter comparing block-by-block of the presented code and a determined value for I-i iterations, such that the total number of iterations I is constant each time a code is presented to gain access to the data processing means.

9. The method of claim 8 further including the step of randomly generating said determined value each time a code is presented to gain access to the data processing means.

10. The method of claim 8 wherein said determined value has the same number of bits as the secret code.

11. The method of claim 8, wherein the bits of said determined value are randomly generated.

12. The method of claim 1 wherein said determined number has the same number of bits as the secret code.

13. The method of claim 1, wherein the bits of said determined number are randomly generated.

* * * * *